(12) United States Patent
Grice et al.

(10) Patent No.: US 9,190,709 B2
(45) Date of Patent: Nov. 17, 2015

(54) ANTENNA APPARATUS WITH A MODIFIED SURFACE

(75) Inventors: Derek Grice, Lancashire (GB); Gavin Cox, Lancashire (GB)

(73) Assignee: RAVEN GROUP LIMITED, Duf Ermune (GB)

( * ) Notice: Subject to any disclaimer, the term of this patent is extended or adjusted under 35 U.S.C. 154(b) by 413 days.

(21) Appl. No.: 13/130,736

(22) PCT Filed: Nov. 20, 2009

(86) PCT No.: PCT/GB2009/002712
§ 371 (c)(1),
(2), (4) Date: Jun. 27, 2011

(87) PCT Pub. No.: WO2010/058174
PCT Pub. Date: May 27, 2010

(65) Prior Publication Data
US 2011/0241952 A1    Oct. 6, 2011

(30) Foreign Application Priority Data

Nov. 21, 2008  (GB) .................................. 0821342.3

(51) Int. Cl.
*H01Q 1/02* (2006.01)
*H01Q 1/42* (2006.01)
(52) U.S. Cl.
CPC ... *H01Q 1/02* (2013.01); *H01Q 1/42* (2013.01)

(58) Field of Classification Search
USPC .............................................. 343/704, 700 R
See application file for complete search history.

(56) References Cited

U.S. PATENT DOCUMENTS

| | | | |
|---|---|---|---|
| 4,783,666 A * | 11/1988 | Ast et al. ...................... 343/872 |
| 4,897,151 A * | 1/1990 | Killackey et al. ............... 216/26 |
| 5,815,125 A | 9/1998 | Kelly | |
| 6,072,440 A | 6/2000 | Bowman | |
| 2004/0021611 A1 | 2/2004 | Iida | |
| 2005/0115507 A1* | 6/2005 | Halachmi et al. .......... 119/14.14 |
| 2007/0126652 A1 | 6/2007 | Wolfenden | |
| 2007/0222691 A1* | 9/2007 | Lee et al. ...................... 343/718 |
| 2010/0097273 A1* | 4/2010 | Biris et al. ................ 343/700 R |
| 2010/0316810 A1* | 12/2010 | Brown .......................... 427/508 |

FOREIGN PATENT DOCUMENTS

WO    WO96/04123 A    2/1996

* cited by examiner

*Primary Examiner* — Allyson Trail
(74) *Attorney, Agent, or Firm* — Gable Gotwals

(57) ABSTRACT

The invention is directed toward antenna apparatus of the type for use in receiving broadcast data signals, such as those transmitted from one or more satellites and also, in certain embodiments the antenna apparatus is capable of transmitting data signals. The antenna apparatus includes at least one component which is provided with a surface, typically an external surface, which is provided with hydrophobic properties such that the gathering of water, condensation and/or snow is reduced hence improving the performance of the antenna and reducing data loss from the data signals.

15 Claims, 2 Drawing Sheets

ANTENNA APPARATUS WITH A MODIFIED SURFACE

CROSS-REFERENCE TO RELATED APPLICATIONS

Figure 1:
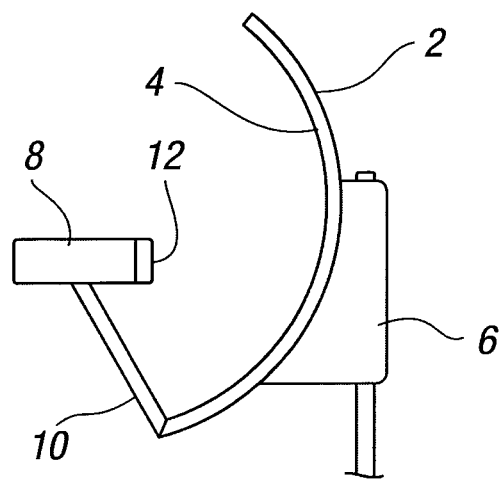

This application is the United States National Phase of PCT Patent Application No. GB2009/002712 filed on 20 Nov. 2009, which claims priority to United Kingdom Patent Application No. 08213423 filed 21 Nov. 2008, both of which are incorporated herein by reference.

The invention to which this application relates is to the provision of antenna apparatus of a type used for receiving and/or transmitting data signals, such as those broadcast from and/or to a satellite by, for example, a television service provider. The antenna apparatus typically comprises a shaped dish which is mounted on a support bracket in conjunction with a feed horn, an Ortho Mode Transducer (OMT) and/or low noise block (LNB) and transmitter (or BUC) which is used to receive or transmit and transfer the received data signals to and from processing apparatus to which the antenna is connected.

The shaped dish can be fabricated from a metal or other suitable material into the required shape and is located on the mounting bracket so as to be directed to face towards the location(s) from and/or to which the data signals are transmitted and/or received. Between the OMT and the dish, there is provided a feed cap which is typically formed of a plastics material and which is provided to enclose and protect data receiving apparatus from the external environment in which the apparatus is positioned and also used to aid matching in certain circumstances.

When locating antenna apparatus, it is critical that the apparatus is located as accurately as possible with regard to the location from which the signals are transmitted and furthermore, that the signal loss of the received and/or transmitted signals is kept as low as possible. For example, the parameters of the gain and margin and/or rain fade of the antenna are critical in ensuring that the quality of the received data is maintained to an acceptable level to allow the service provided to the user of the apparatus to be of an acceptable quality.

One known problem is loss of signal strength in terms of a reduction in transmission and/or reception gain, or error in the data received, which is caused through the occurrence of rain, snow or hail and its retention on the antenna and in particular, retention on the feed cap. Alternatively, the loss, in combination with other parameters of the antenna apparatus can mean that the data error rate is unacceptably high. Conventionally this has meant that other parameters are adjusted which typically increases the expense and/or complexity of the antenna.

As a result of this known problem, solutions have been attempted in the past for antenna apparatus, such as, choosing to manufacture the feed cap from specific types of plastics material and/or to apply a coating to the external surface of the feed cap in order to reduce the retention of liquid on the same and thereby affecting the reception of data. A problem with the application of a coating of, for example, a hydrophobic paint, is that the same tends to break down over time in the environment and indeed, in certain instances, can form a material which collects debris and can end up providing antenna apparatus with a worse performance than if the coating had not been applied.

The aim of the present invention is to provide an antenna apparatus which is formed so as to reduce the effect of environmental conditions on the reception of data signals via the apparatus.

In a first aspect of the invention, there is provided antenna apparatus for the reception of data signals, said antenna apparatus including at least one component having a surface formed so as to have hydrophobic qualities.

In one embodiment, the surface of the component is formed at the time of moulding from plastics material, to have an external surface with said hydrophobic properties.

Typically, the component is a feed cap, through which the received data signals pass and a surface of the same, typically a surface which is externally positioned in use of the feed cap, is formed with said hydrophobic properties.

In one embodiment, the said surface has a three dimensional profile.

Typically, the three dimensional profile is formed using a mould into which the matching and reverse of the three dimensional profile has been formed using laser etching.

In one embodiment, the three dimensional profile is provided in a regular pattern.

Typically, the hydrophobic property of the said surface is such that the contact angle of a drop of water is 100° or greater.

In one embodiment the contact angle is at or greater than 130° which is achieved by forming a selected three dimensional hydrophobic profile on the surface.

Typically, the said surface profile which is created has a contact angle for a drop of water which is greater than that of a substantially smooth surface of said material.

In one embodiment, the feed cap is manufactured from polypropylene but it should be understood that the same could also be manufactured in other suitable plastic.

In one embodiment, the feed cap is formed by injection moulding. In an alternative method, the feed cap is formed by vacuum forming using a laser etched former with the pattern formed therein, to imprint the surface of the feed cap.

In one embodiment, the said surface is flat or may be shaped such as to have a substantially domed shape.

In one embodiment the said surface is that which forms an external face of the component in use.

In one embodiment the opposing internal surface to the external surface is also formed with a three dimensional profile in order to improve the hydrophobic properties of the same.

In a further aspect of the invention, there is provided a method of forming a component for a data receiving antenna apparatus, said component having an external surface and an opposing internal surface, said method comprising the steps of; forming a mould such that the part of the mould to form the external surface of the component, is laser etched to form a three dimensional pattern thereon, injection moulding plastics material via the mould to form the component, wherein the component has an external surface having a three dimensional profile with hydrophobic properties.

In one embodiment, the mould is formed such that both the external and internal surfaces have a three dimensional profile with hydrophobic properties, with the external face having the said properties in order to minimise the retention of water or snow which may have fallen, on said face, and the internal face having hydrophobic properties to minimise the retention of condensation thereon.

In one embodiment the component is a feed cap.

Typically the cap includes a skirt and/or further means are provided to allow the feed cap to be attached to the remainder of the antenna apparatus.

Typically, the pattern is applied to the mould using a laser etching technique.

In one embodiment, the laser etching is provided by a single laser spot beam which may be split to decrease the processing time.

In a further aspect of the invention there is provided a component for antenna apparatus for receiving digital data, wherein said component has at least one portion through which received data passes and at least a surface of said portion has a three dimensional profile to improve the hydrophobic characteristic of the same.

In one embodiment the component is a dichroic cover, typically for use with a frequency selective surface (FSS) antenna.

In another embodiment the component is a radome cover such that the antenna dish surface is protected by the cover.

Figure 2A:
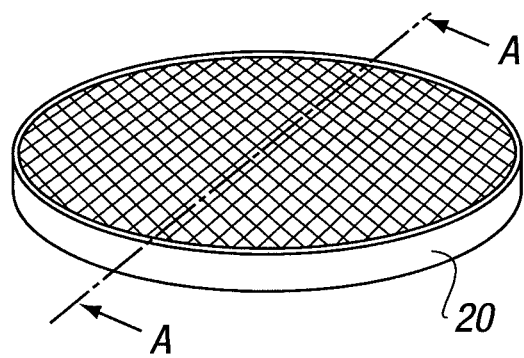
Figure 2B:
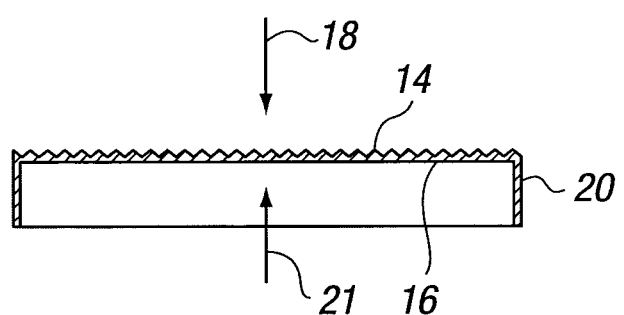
Figure 2C:
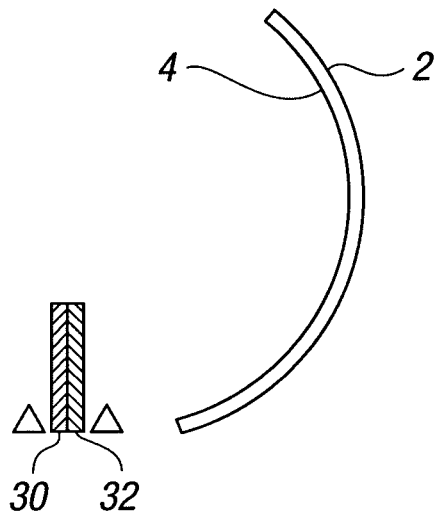
Figure 3:
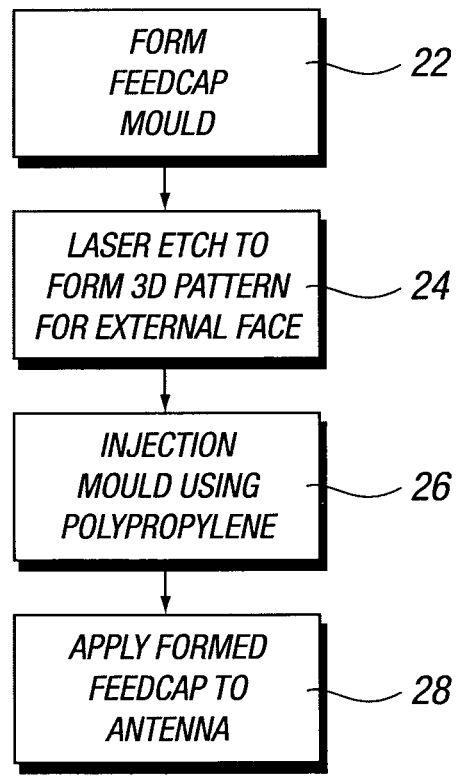

Specific embodiments of the invention are now described with reference to the accompanying drawings wherein;

FIG. 1 illustrates an antenna in accordance with one embodiment of the invention;

FIGS. 2a-c illustrates a component in the form of a feed cap of the antenna of FIG. 1 in accordance with one embodiment of the invention; and FIG. 3 illustrates a method for forming the feed cap in accordance with one embodiment of the invention.

Referring firstly to FIG. 1, there is illustrated antenna apparatus 2 in accordance with one embodiment of the invention. The antenna apparatus comprises a dish 4 typically formed from sheet metal and which is shaped so as to provide optimum receipt of transmitted digital data signals. The signals are typically transmitted from one or more satellites and the dish is typically located so as to maximise the quality of receipt of said data signals at the particular location.

The dish is mounted on a bracket 6 which allows the antenna apparatus to be located on a support surface, such as, for example, the wall of a building (not shown) and also to allow the location of the antenna apparatus to be adjusted with respect to the particular location from which the data signals are transmitted to ensure that the best possible receiving position is achieved. The received data signals collected by the antenna dish 4, pass to receiving means 8, mounted on arm 10 in front of the dish 4. It should also be appreciated that in certain instances the antenna apparatus may be used to transmit data signals.

A feed cap 12 is provided as part of the antenna apparatus. The feed cap encloses the receiving apparatus within the receiving means 8 and protects the same from the external environment and from damage therefrom. However, the received data signals are required to pass through the feed cap 12 and so any debris or water which collects on the internal or external surfaces 14, 16 of the same can affect the quality of the received data signals and hence affect the quality of the service provided to the user which is generated from said received data signals.

The feed cap is shown in more detail in FIGS. 2a and b. The feed cap comprises an external face 14 and an opposing internal face 16 and the received data signals pass through said faces 14 and 16 towards the receiving apparatus as indicated by the arrow 18. The feed cap also includes a skirt 20 which, alone, or in conjunction with other engagement means, allows the feed cap to be received and located on the receiving means 8. The apparatus can also be used to transmit data signals as indicated by arrow 21 and so data signals may be required to pass in both directions through the feed cap.

In accordance with the invention, the feed cap has, in this embodiment, an external face 14 formed with a three dimensional profile as shown schematically in FIG. 2b. This three dimensional profile is designed to allow the external surface to have an improved hydrophobic property in that the three dimensional profile reduces the possibility of water droplets from being retained on said external surface 14. Typically, for a water droplet, this means that the external surface has a contact angle of greater than 100°, preferably 130°, in accordance with the invention.

In a further embodiment, the internal surface 16, may also be provided the with the same or an alternative three dimensional profile so as to improve the hydrophobic properties of that surface so as to thereby prevent or minimise the collection of condensation droplets on said surface.

FIG. 3 illustrates a method of manufacture of the feed cap 12 of FIGS. 2a and b. The first stage 22 is to form the mould from which the feed cap 12 is to be manufactured. This formation includes the step of using laser etching 24 to form the three dimensional pattern on the part of the mould to be used to form the external surface 14 of the feed cap 12 and any other surface of the feed cap which is to have the three dimensional profile. Once the laser etching has been performed, the mould can then be used in a plastic injection moulding process 26 typically using polypropylene.

The formed feed cap can then be applied to the antenna apparatus 28, with the external surface 14 having the desired improved hydrophobic properties.

FIG. 2c illustrates another form of component, in this case a dichroic cover in which both surfaces 30,32 are provided with hydrophobic surfaces.

The provision of a component of the antenna apparatus, such as the feed cap, with at least an external surface having improved hydrophobic properties, means that the occurrence of signal loss in the service generated from the received data signals is reduced. Furthermore, the occurrence of signal loss is reduced and maintained over the life of the antenna apparatus as the surface has the profile formed therein permanently. This, in turn, means that other component features and parameters, which are typically incorporated into the antenna in order to reduce error, may not be necessary, such as, for example, the need for silver plating of components may no longer be required, and/or the size of the antenna dish may be reduced, and/or the power of transmission of the data signals may be reduced, and/or the power of the terminal ground may be reduced as, if the performance of the feed cap, and the data received, is improved, then these other features may be changed, or no longer required in order to ensure that the quality of data is maintained above an acceptable level. Thus, the provision of the feed cap in accordance with the invention, reduces the overall strain and stresses on the operating parameters of the antenna as a whole and therefore allows other options in terms of redesign of the antenna to be considered and also allows the ability for the cost of the antenna to be reduced.

While the invention has been described with a certain degree of particularity, it is manifest that many changes may be made in the details of construction and the arrangement of components without departing from the spirit and scope of this disclosure, it is understood that the invention is not limited to the embodiments set forth herein for purposes of exemplification, but is limited only by the scope of the attached claims, including the Pall range of equivalency to which each element thereof is entitled.

The invention claimed is:

1. Antenna apparatus for the reception of data signals, said antenna apparatus comprising:
    at least one component in the form of a feed cap through which received data signals pass, said feed cap formed by injection molding to have at least one surface formed with a three dimensional profile, said three-dimensional profile formed as an integral part of the feed cap at the time of molding the feed cap from plastics material so as to cause said feed cap surface to have hydrophobic properties wherein the feed cap includes a skirt and/or further attachment means for attaching the feed cap to a remainder of the antenna apparatus.

2. The antenna apparatus according to claim 1 wherein the feed cap is manufactured from polypropylene.

3. The antenna apparatus according to claim 1 wherein the feed cap is formed by vacuum forming using a laser etched former with a pattern formed therein, to imprint a surface of the feed cap.

4. The antenna apparatus according to claim 1 wherein the three-dimensional profile is formed using a mold into which a matching or reverse of the three-dimensional profile has been formed using laser etching.

5. The antenna apparatus according to claim 1 wherein the three-dimensional profile is provided in a regular pattern.

6. The antenna apparatus according to claim 1 wherein said at least one surface is flat.

7. The antenna apparatus according to claim 1 wherein the at least one surface is shaped to have a substantially domed shape.

8. The antenna apparatus according to claim 1 wherein said at least one surface is an external surface of the at least one component when in use.

9. The antenna apparatus according to claim 8 wherein an opposing internal surface is formed with a three-dimensional profile to provide hydrophobic properties.

10. The antenna apparatus according to claim 1 wherein the hydrophobic properties of said at least one surface is such that a contact angle of a drop of water therein is 100° or greater.

11. The antenna apparatus according to claim 10 wherein the contact angle is greater than 130°.

12. A method of forming a feed cap component for a data receiving antenna apparatus, the component having an external surface and an opposing internal surface, said method comprising the steps of:

forming a mold such that at least a part of the mold to form the external surface of the component is laser etched to form a three-dimensional pattern thereon; and injection molding plastics material via the mold to form the component with an external surface having a three-dimensional profile with hydrophobic properties and wherein the surface is formed integrally with the feed cap at the time of molding the feed cap from said plastics material.

13. The method according to claim 12 wherein the mold is formed such that both external and internal surfaces have a three-dimensional profile with hydrophobic properties.

14. The method according to claim 13 wherein the external surface has hydrophobic properties to minimize retention of water or snow which may have fallen on the external surface, and the internal surface has the hydrophobic properties to minimize the retention of condensation thereon.

15. A component for an antenna for receiving digital data, said component is a dichroic cover comprising:

at least one portion through which received data passes and at least one surface of said portion has a three-dimensional profile formed at the time of molding the dichroic cover from plastics material to improve hydrophobic properties of the surface, said cover including a skirt and/or further attachment means for attaching the cover to antenna apparatus.

\* \* \* \* \*